Dec. 14, 1926.
G. W. DENTON
CUSHION TIRE FOR VEHICLES
Filed Jan. 7, 1926.
1,610,267
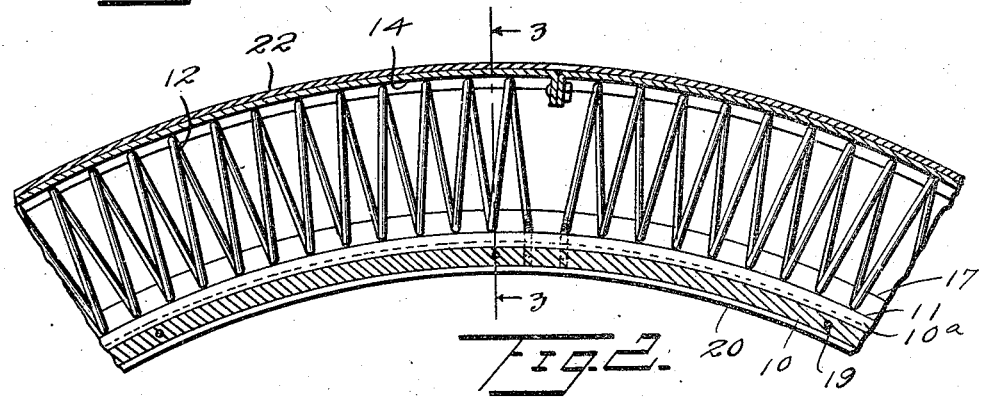
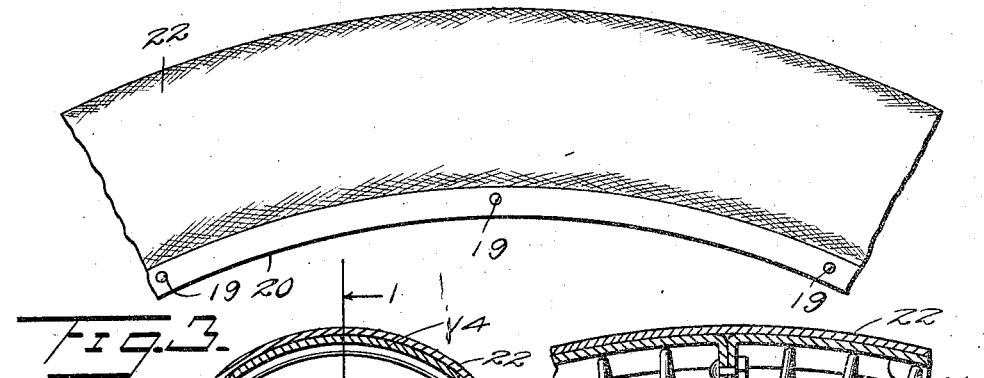
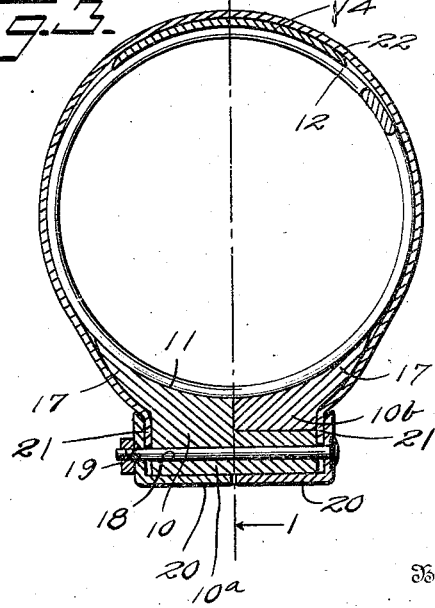
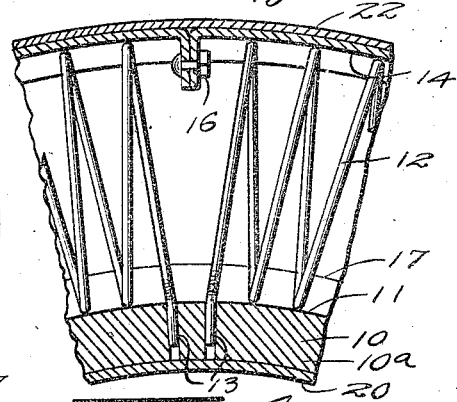
Inventor
G. W. Denton.
By Watson E. Coleman
Attorney Patented Dec. 14, 1926.

1,610,267

UNITED STATES PATENT OFFICE.

GEORGE W. DENTON, OF SOUTH BEND, INDIANA, ASSIGNOR OF ONE-HALF TO JEFFERSON J. YOUNG, OF MISHAWAKA, INDIANA.

CUSHION TIRE FOR VEHICLES.

Application filed January 7, 1926. Serial No. 79,883.

This invention relates to cushion tires for vehicles and more particularly to a cushion tire embodying the use of a coil spring and an elastic band supported from this spring.

An important object of the invention is to provide an efficient means for supporting the coil spring and at the same time permitting the use of a cover for enclosing the spring to protect the same from the action of the weather and the elements.

A further object of the invention is to provide a construction of this character in which any of the parts may be readily replaced in event of breakage.

These and other objects I attain by the construction shown in the accompanying drawing, wherein for the purpose of illustration is shown a preferred embodiment of my invention and wherein:—

Figure 1 is a longitudinal sectional view taken through a portion of a cushion wheel constructed in accordance with my invention and taken on the line 1—1 of Figure 3;

Figure 2 is a side elevation thereof;

Figure 3 is a section on the line 3—3 of Figure 1;

Figure 4 is an enlarged detail section similar to that shown in Figure 1.

Referring now more particularly to the drawing, the numeral 10 generally designates an annular seat provided in its outer face with a groove 11 having an arcuate face. This groove receives the inner face of a circular spring helix 12 extending entirely around the annular seat 10. The ends of this spring, if so desired, may be provided with angular extensions 13 engaging in an opening formed in the seat to prevent circumferential movement of the spring upon the seat.

An annular wear band 14 is provided, this band fitting the outer surface of the helix and being transversely curved to conform to the transverse curvature of the helix. The ends of the band are preferably inturned and are secured together by bolts, as at 16. The annular seat 10 hereinbefore referred to is preferably made in two sections 10ª, 10ᵇ, each having a wing 17 projecting beyond the side face of the sections and extending the seat which is provided for the helix. The annular member 10 is further provided with openings 18 paralleling the axis of the member receiving bolts 19 for clamping together upon the body of the seat split rim sections 20. These rim sections, in addition to providing a means for applying the tire to the wheel, also provide means for attaching to the annular member 10 the edges 21 of a cover member 22 completely surrounding the wear plate 14 and helix 12 to protect the same against the entry of dirt and dust. The cover may be produced from any suitable material and may be made of any desired thickness. It will be obvious that the coils of the helix will yield under pressure, thus cushioning the movement of the wheel over the ground and it will also be obvious that the plate 14 will protect the casing 22 against the action of the coils.

Since the construction hereinbefore set forth is obviously capable of a certain range of change and modification without materially departing from the spirit of the invention, I do not limit myself to such specific structure except as hereinafter claimed.

I claim:—

A cushion tire comprising an annular seat, an annular helix engaged with the outer face of the seat and having engagement with the seat to prevent circumferential movement of the helix bodily upon the seat while permitting free movement of the coils of the helix intermediate the ends thereof, an annular wear plate abutting the outer face of the helix and a casing enclosing the helix to protect the same from the elements, said annular seat having in its outer face a groove conforming in transverse curvature to the curvature of the helix, the seat being formed in two sections each provided with a wing extending the seat and split rim sections secured together and engaged with the annular seat and with the casing to maintain the sections of the annular seat in assembled relation and to clamp the casing thereto.

In testimony whereof I hereunto affix my signature.

GEORGE W. DENTON.